US012207068B2

(12) United States Patent
Souviraa-Labastie et al.

(10) Patent No.: US 12,207,068 B2
(45) Date of Patent: *Jan. 21, 2025

(54) AUDIO APPARATUS AND METHOD OF OPERATION THEREFOR

(71) Applicant: KONINKLIJKE PHILIPS N.V., Eindhoven (NL)

(72) Inventors: Nathan Souviraa-Labastie, Mons-en-Baroeul (FR); Jeroen Gerardus Henricus Koppens, Nederweert (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,505

(22) Filed: Nov. 7, 2022

(65) Prior Publication Data

US 2023/0058952 A1 Feb. 23, 2023

Related U.S. Application Data

(63) Continuation of application No. 17/258,476, filed as application No. PCT/EP2019/068312 on Jul. 9, 2019, now Pat. No. 11,523,219.

(30) Foreign Application Priority Data

Jul. 9, 2018 (EP) .................................... 18182373

(51) Int. Cl.

*H04R 5/033* (2006.01)
*H04R 1/10* (2006.01)
*H04S 7/00* (2006.01)

(52) U.S. Cl.

CPC ........... *H04R 5/033* (2013.01); *H04R 1/1008* (2013.01); *H04R 1/1083* (2013.01); *H04S 7/304* (2013.01);

(Continued)

(58) Field of Classification Search

CPC .... H04R 5/033; H04R 1/1008; H04R 1/1083; H04R 2460/01; H04R 2460/15;

(Continued)

(56) References Cited

U.S. PATENT DOCUMENTS

2011/0026724 A1* 2/2011 Doclo .................. H04R 1/1083 381/71.8
2011/0150233 A1* 6/2011 Gautama .......... G10K 11/17857 381/71.6

(Continued)

FOREIGN PATENT DOCUMENTS

EP 1227392 A2 7/2002
WO WO-2017178309 A1 * 10/2017 ............. A63F 13/54

(Continued)

OTHER PUBLICATIONS

International Search Report and Written Opinion From PCT/EP2019/068312 Mailed Aug. 2, 2019.

*Primary Examiner* — Carolyn R Edwards
*Assistant Examiner* — Friedrich Fahnert

(57) ABSTRACT

An audio apparatus, e.g. for rendering audio for a virtual/augmented reality application, comprises a receiver (201) for receiving audio data for an audio scene including a first audio component representing a real-world audio source present in an audio environment of a user. A determinator (203) determines a first property of a real-world audio component from the real-world audio source and a target processor (205) determines a target property for a combined audio component being a combination of the real-world audio component received by the user and rendered audio of the first audio component received by the user. An adjuster (207) determines a render property by modifying a property of the first audio component indicated by the audio data for the first audio component in response to the target property (Continued)

and the first property. A renderer (209) renders the first audio component in response to the render property.

20 Claims, 2 Drawing Sheets

(52) U.S. Cl.
CPC ....... *H04R 2460/01* (2013.01); *H04S 2400/11* (2013.01)

(58) Field of Classification Search
CPC .. H04S 7/304; H04S 2400/11; H04S 2400/15; H04S 2420/03; H04S 2400/13; H04S 2420/01
USPC ........................................................ 381/310
See application file for complete search history.

(56) References Cited

U.S. PATENT DOCUMENTS

| | | | | |
|---|---|---|---|---|
| 2013/0236040 | A1 | 9/2013 | Crawford et al. | |
| 2016/0212538 | A1* | 7/2016 | Fullam | H04S 7/40 |
| 2017/0266913 | A1 | 12/2017 | Stein et al. | |
| 2018/0027349 | A1* | 1/2018 | Osman | H04S 7/302 381/303 |
| 2018/0192227 | A1* | 7/2018 | Woelfl | H04R 3/02 |
| 2018/0286129 | A1* | 10/2018 | Harviainen | G02B 27/017 |
| 2019/0058952 | A1* | 2/2019 | Nawfal | H04R 5/04 |
| 2019/0174246 | A1* | 6/2019 | De Bruijn | G06F 3/012 |

FOREIGN PATENT DOCUMENTS

| | | | | |
|---|---|---|---|---|
| WO | WO-2020011588 | A1 * | 1/2020 | G06F 3/165 |
| WO | WO-2020210249 | A1 * | 10/2020 | G10K 11/17853 |

* cited by examiner

AUDIO APPARATUS AND METHOD OF OPERATION THEREFOR

CROSS-REFERENCE TO PRIOR APPLICATIONS

This application is a continuation of U.S. patent application Ser. No. 17/258,476 which is the U.S. National Phase application under 35 U.S.C. § 371 of International Application No. PCT/EP2019/068312, filed on Jul. 9, 2019, which claims the benefit of EP Patent Application No. EP 18182373.3, filed on Jul. 9, 2018. These applications are hereby incorporated by reference herein.

FIELD OF THE INVENTION

The invention relates to an apparatus and method for rendering audio for a scene and in particular, but not exclusively, to rendering audio for an audio scene of an Augmented/Virtual Reality application.

BACKGROUND OF THE INVENTION

The variety and range of experiences based on audiovisual content have increased substantially in recent years with new services and ways of utilizing and consuming such content being continuously developed and introduced. In particular, many spatial and interactive services, applications and experiences are being developed to give users a more involved and immersive experience.

Examples of such applications are Virtual Reality (VR) and Augmented Reality (AR) applications, which are rapidly becoming mainstream, with a number of solutions being aimed at the consumer market. A number of standards are also under development by a number standardization bodies. Such standardization activities are actively developing standards for the various aspects of VR/AR systems including e.g. streaming, broadcasting, rendering, etc.

VR applications tend to provide user experiences corresponding to the user being in a different world/environment/scene whereas AR applications tend to provide user experiences corresponding to the user being in the current environment but with additional information or virtual objects or information being added. Thus, VR applications tend to provide a fully inclusive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in being based on a predetermined model of the scene, and typically on an artificial model of a virtual world. In some applications, a virtual reality experience may be provided based on real-world capture. In many cases such an approach tends to be based on a virtual model of the real-world being built from the real-world captures. The virtual reality experience is then generated by evaluating this model.

Many current approaches tend to be suboptimal and tend to often have a high computational or communication resource requirement and/or provide a suboptimal user experience with e.g. reduced quality or restricted freedom.

As an example of an application, virtual reality glasses have entered the market which allow viewers to experience captured 360 degree (panoramic) or 180 degree video. These 360 degree videos are often pre-captured using camera rigs where individual images are stitched together into a single spherical mapping. Common stereo formats for 180 or 360 video are top/bottom and left/right. Similar to non-panoramic stereo video, the left-eye and right-eye pictures are compressed as part of a single H.264 video stream. After decoding a single frame, the viewer rotates his/her head to view the world around him/her.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

For audio, the focus has until now mostly been on headphone reproduction using binaural audio rendering technology. In many scenarios, headphone reproduction enables a highly immersive, personalized experience to the user. Using headtracking, the rendering can be made responsive to the user's head movements, which highly increases the sense of immersion.

Recently, both in the market and in standards discussions, use cases are starting to be proposed that involve a "social" or "shared" aspect of VR (and AR), i.e. the possibility to share an experience together with other people. These can be people at different locations, but also people at the same location (or a combination of both). For example, several people in the same room may share the same VR experience with a projection (audio and video) of each participant being present in the VR content/scene.

In order to provide the optimum experience, it is desirable for the audio and video perception to align closely, and in particular for AR applications it is desirable for this to further align with the real-world scene. However, this is often difficult to achieve as there may be a number of issues that can impact the user's perception. For example, in practice the user will typically use the apparatus in a location that cannot be guaranteed to be completely silent or dark. Although headsets may seek to block out light and sound, this will typically only be achieved imperfectly. Further, in AR applications, it is often part of the experience that the user can experience the local environment and it is therefore not practical to block this environment out completely.

Hence, an improved approach for generating audio, in particular for a virtual/augmented reality experience/application, would be advantageous. In particular, an approach that allows improved operation, increased flexibility, reduced complexity, facilitated implementation, an improved audio experience, a more consistent perception of an audio and visual scene, reduced error sensitivity to sources in a local environment; an improved virtual reality experience, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio apparatus comprising: a receiver for receiving audio data for an audio scene, the audio data comprising audio data for a first audio component representing a real-world audio source in an audio environment of a user; a determinator for determining a first property of a real-world audio component reaching the user from the real-world audio source via sound propagation; a target processor for determining a target property for a combined audio component received by the user in response to the audio data for the first audio component, the combined audio component being a combination of the real-world audio component received by the user via sound propagation and rendered audio of the first audio component received by the user; an adjuster for determining a render property for the first audio component by modifying a property of the first audio component indicated by the audio data for the first audio component in response to the target property and the first property; and a renderer for rendering the first audio component in response to the render property.

The invention may provide an improved user experience in many embodiments and may specifically provide improved audio perception in scenarios wherein audio data is rendered for an audio source that is also locally present. The audio source may be the person or object in the real world from which the audio originates. An improved and more natural perception of the audio scene may typically be achieved and in many scenarios interference and inconsistency resulting from local real-world sources may be mitigated or reduced. The approach may be particularly advantageous for Virtual Reality, VR, (including Augmented Reality, AR) applications. It may for example provide an improved user experience for e.g. social VR/AR applications wherein a plurality of participants is present in the same location.

The approach may in many embodiments provide improved performance while maintaining low complexity and resource usage.

The first audio component and the real-world audio component may originate from the same local audio source with the first audio component being an audio encoded representation of audio from the local audio source. The first audio component may typically be linked to a position in the audio scene. The audio scene may specifically be a VR/AR audio scene, and may represent virtual audio for a virtual scene.

The target property for the combined audio component received by the user may be a target property for the combined sound which may be the combination of the sound reaching the user and the sound originating from the real-world audio source (it may be indicative of a desired property for the sound from the real-world audio source whether reaching the user directly via sound propagation in the audio environment or via the rendered audio (and thus via the audio data being received)).

In accordance with an optional feature of the invention, the target property is a target perceived position of the combined audio component.

The approach may provide an improved spatial representation of the audio scene with reduced spatial distortion being caused by interference from local audio sources also present in the audio scene of the received audio data. The first property may be a position indication for the real-world audio source. The target property may be a target perceived position in the audio scene and/or the local audio environment. The render property may be a render position property for the rendering of the first audio component. The positions may be absolute positions, e.g. in relation to a common coordinate system, or may be relative positions.

In accordance with an optional feature of the invention, the target property is a level of the combined audio component.

The approach may provide an improved representation of the audio scene with reduced level distortion being caused by interference from local audio sources also present in the audio scene of the received audio data. The first property may be a level of the real-world audio component, and the render property may be a level property. A level may also be referred to as an audio level, signal level, amplitude level, or loudness level.

In accordance with an optional feature of the invention, the adjuster is arranged to determine the render property as a render level corresponding to a level for the first audio component indicated by the audio data reduced by an amount determined as a function of a level of the real-world audio component received by a user.

This may provide improved audio perception in many embodiments.

In accordance with an optional feature of the invention, the target property is a frequency distribution of the combined audio component.

The approach may provide an improved representation of the audio scene with reduced frequency distortion being caused by interference from local audio sources also present in the audio scene of the received audio data. For example, if the user is wearing headphones that only partially attenuate external sound, the user may hear both a rendered version of a speaker in the same room as well as a version which is reaching the user directly in the room. The headphone may have a frequency dependent attenuation of external sound and the rendered audio may be adapted such that the combined perceived sound has the desired frequency content and compensates for the frequency dependent attenuation of the external sound.

The first property may be a frequency distribution of the real-world audio component, and the render property may be a frequency distribution property. A frequency distribution may also be referred to as a frequency spectrum, and may be a relative measure. For example, a frequency distribution may be represented by a frequency response/transfer function relative to a frequency distribution of an audio component.

In accordance with an optional feature of the invention, the renderer is arranged to apply a filter to the first audio component, the filter having a frequency response complementary to a frequency response of an acoustic path from the real-world audio source to the user.

This may provide improved performance and audio perception in many scenarios.

In accordance with an optional feature of the invention, the determinator is arranged to determine the first property in response to an acoustic transfer characteristic for external sound for a headphone used to render the first audio component.

This may provide improved performance and audio perception in many scenarios. The acoustic transfer characteristic may be a property of an acoustic transfer function (or indeed may be the acoustic transfer function). The acoustic transfer function/characteristic may comprise or consist in an acoustic transfer function/characteristic for a leakage for a headphone.

In accordance with an optional feature of the invention, the acoustic transfer characteristic comprises at least one of a frequency response and a headphone leakage property.

This may provide improved performance and audio perception in many scenarios.

In accordance with an optional feature of the invention, the determinator is arranged to determine the first property in response to a microphone signal capturing the audio environment of the user.

This may provide improved performance and audio perception in many scenarios. It may in particular allow low complexity and/or accurate determination of a property of the real-world audio component in many embodiments. The microphone signal may in many embodiments be for a microphone positioned within headphones used for the rendering of the first audio component.

In accordance with an optional feature of the invention, the adjuster is arranged to determine the render property in response to a psychoacoustic threshold for detecting audio differences.

This may in many embodiments reduce complexity without unacceptably sacrificing performance.

In accordance with an optional feature of the invention, the determinator is arranged to determine the first property in response to a detection of an object corresponding to the audio source in an image of the audio environment.

This may be particularly advantageous in many practical applications, such as in many VR/AR applications.

In accordance with an optional feature of the invention, the receiver is arranged to identify the first audio component as corresponding to the real-world audio source in response to a correlation between the first audio component and a microphone signal capturing the audio environment of the user.

This may be particularly advantageous in many practical applications.

In accordance with an optional feature of the invention, the receiver is arranged to identify the first audio component as corresponding to the real-world audio source in response to metadata of the audio scene data.

This may be particularly advantageous in many practical applications.

In accordance with an optional feature of the invention, the audio data represents an augmented reality audio scene corresponding to the audio environment.

According to an aspect of the invention there is provided a method of processing audio data, the method comprising: receiving audio data for an audio scene, the audio data comprising audio data for a first audio component representing a real-world audio source in an audio environment of a user: determining a first property of a real-world audio component reaching the user from the real-world audio source via sound propagation; determining a target property for a combined audio component received by the user in response to the audio data for the first audio component, the combined audio component being a combination of the real-world audio component received by the user via sound propagation and rendered audio of the first audio component received by the user; determining a render property for the first audio component by modifying a property of the first audio component indicated by the audio data for the first audio component in response to the target property and the first property; and rendering the first audio component in response to the render property.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
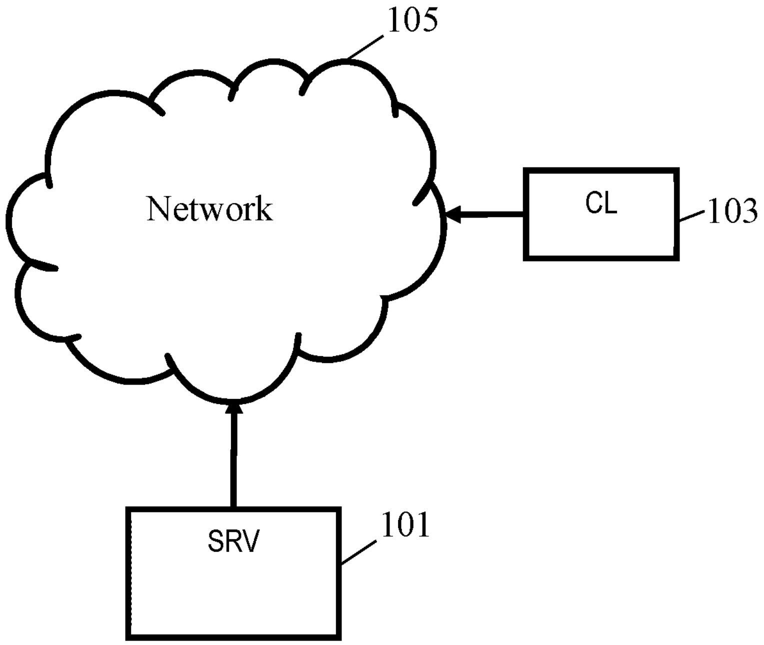
FIG. 1 illustrates an example of client server arrangement for providing a virtual reality experience.

Virtual (including augmented) experiences allowing a user to move around in a virtual or augmented world are becoming increasingly popular and services are being developed to satisfy such demands. In many such approaches, visual and audio data may dynamically be generated to reflect a user's (or viewer's) current pose.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be represented by fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A system or entity based on providing the maximum degree of freedom for the viewer is typically referred to as having 6 Degrees of Freedom (6DoF). Many systems and entities provide only an orientation or position and these are typically known as having 3 Degrees of Freedom (3DoF).

Typically, the virtual reality application generates a three-dimensional output in the form of separate view images for the left and the right eyes. These may then be presented to the user by suitable means, such as typically individual left and right eye displays of a VR headset. In other embodiments, one or more view images may e.g. be presented on an autostereoscopic display, or indeed in some embodiments only a single two-dimensional image may be generated (e.g. using a conventional two-dimensional display).

Similarly, for a given viewer/user/listener pose, an audio representation of the scene may be provided. The audio scene is typically rendered to provide a spatial experience where audio sources are perceived to originate from desired positions. As audio sources may be static in the scene, changes in the user pose will result in a change in the relative position of the audio source with respect to the user's pose. Accordingly, the spatial perception of the audio source should change to reflect the new position relative to the user. The audio rendering may accordingly be adapted depending on the user pose.

In many embodiments, the audio rendering is a binaural rendering using Head Related Transfer Functions (HRTFs) or Binaural Room Impulse Responses (BRIRs) (or similar) to provide the desired spatial effect for a user wearing a headphone. However, it will be appreciated that in some systems, the audio may instead be rendered using a loudspeaker system and the signals for each loudspeaker may be rendered such that the overall effect at the user corresponds to the desired spatial experience.

The viewer or user pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position of the VR headset.

In some systems, the viewer pose may be provided by manual means, e.g. by the user manually controlling a joystick or similar manual input. For example, the user may manually move the virtual viewer around in the virtual scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

In some systems, the VR application may be provided locally to a viewer by e.g. a standalone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene data. The view images are then transmitted to the device local to the viewer where they are presented. For example, the remote device may directly generate a video stream (typically a stereo/3D video stream) which is directly presented by the local device. Similarly, the remote device may generate an audio scene reflecting the virtual audio environment. This may in many embodiments be done by generating audio signals that correspond to the relative position of different audio sources in the virtual audio environment, e.g. by applying binaural processing to the individual audio components corresponding to the current position of these relative to the head pose. Thus, in such an example, the local device may not perform any VR processing except for transmitting movement data and presenting received video and audio data.

In many systems, the functionality may be distributed across a local device and remote device. For example, the local device may process received input and sensor data to generate viewer poses that are continuously transmitted to the remote VR device. The remote VR device may then generate the corresponding view images and transmit these to the local device for presentation. In other systems, the remote VR device may not directly generate the view images but may select relevant scene data and transmit this to the local device which may then generate the view images that are presented. For example, the remote VR device may identify the closest capture point and extract the corresponding scene data (e.g. spherical image and depth data from the capture point) and transmit this to the local device. The local device may then process the received scene data to generate the images for the specific, current view pose.

Similarly, the remote VR device may generate audio data representing an audio scene, transmitting audio components/objects corresponding to different audio sources in the audio scene together with position information indicative of the position of these (which may e.g. dynamically change for moving objects). The local VR device may then render such signals appropriately, e.g. by applying appropriate binaural processing reflecting the relative position of the audio sources for the audio components.

FIG. 1 illustrates such an example of a VR system in which a remote VR server 101 liaises with a client VR device 103 e.g. via a network 105, such as the Internet. The remote VR server 101 may be arranged to simultaneously support a potentially large number of client VR devices 103.

Such an approach may in many scenarios provide an improved trade-off e.g. between complexity and resource demands for different devices, communication requirements etc. For example, the viewer pose and corresponding scene data may be transmitted with larger intervals with the local device processing the viewer pose and received scene data locally to provide a real time low lag experience. This may for example substantially reduce the required communication bandwidth while providing a low lag experience and while allowing the scene data to be centrally stored, generated, and maintained. It may for example be suitable for applications where a VR experience is provided to a plurality of remote devices.

Figure 2:
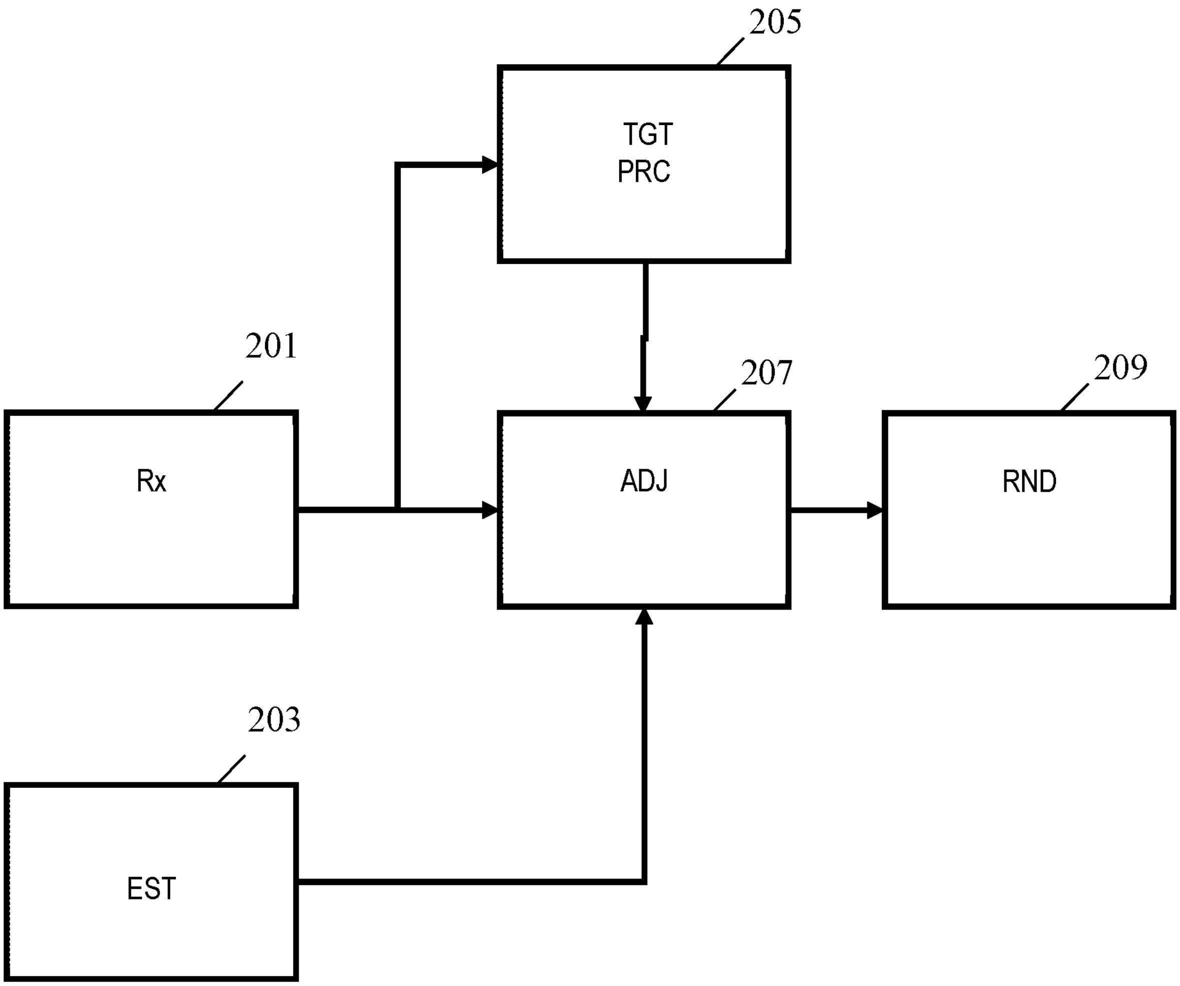
FIG. 2 illustrates an example of elements of an audio apparatus in accordance with some embodiments of the invention.

FIG. 2 illustrates an audio apparatus for rendering audio based on received audio data for an audio scene. The apparatus may be arranged to generate audio providing an audio representation of the scene and may specifically be used in a VR application to provide an audio representation of the VR/AR environment. The apparatus may be complemented by an apparatus generating a visual representation of the scene as will be known by the person skilled in the art. The apparatus may accordingly form part of a system providing an immersive VR/AR experience with coordinated provision of spatial audio and video. The apparatus of FIG. 2 may be part of the client VR device 103 of FIG. 1.

The apparatus of FIG. 2 is arranged to receive and process audio data for an audio scene which in the specific example corresponds to a scene for an VR (AR) experience. For example, user head movements/pose may be tracked and fed to a local or remote VR server that proceeds to generate 3D video images and spatial audio corresponding to the user pose. The corresponding spatial audio data may be processed by the apparatus of FIG. 2.

The audio data may include data for a plurality of audio components or objects. The audio may for example be represented as encoded audio for a given audio component which is to be rendered. The audio data may further comprise positional data which indicates a position of the source of the audio component. The positional data may for example include absolute position data defining a position of the audio source in the scene. The local apparatus may in such an embodiment determine a relative position of the audio source relative to the current user pose. Thus, the received position data may be independent of the user's movements and a relative position for audio sources may be determined locally to reflect the position of the audio source with respect to the user. Thus, such a relative position may indicate the relative position of where the user should perceive the audio source to originate from, it will accordingly vary depending on the user's head movements. In other embodiments, the audio data may comprise position data which directly describes the relative position.

An issue for many such practical systems and applications is that audio in the general environment may impact the user experience. In practice, it tends to be difficult to completely suppress the audio in the local environment and indeed even if wearing headphones there is typically a perceivable contribution from the local environment to the perceived audio. In some cases, such sounds may be suppressed using e.g. active noise cancellation. However, this is not practical for audio sources that have a direct counterpart in the VR scene.

Indeed, the problem of interference between real environment sounds and audio scene sounds is particularly problematic for applications that provide a VR experience that also reflects the local environment, such as for example many AR experiences.

For example, applications are being pursued which include a "social" or "shared" aspect of VR where for example a plurality of people in the same local environment (e.g. room) share a common experience. Such "social" or "shared" use cases are being proposed e.g. in MPEG, and are now one of the main classes of experience for the current MPEG-I standardization activity. An example of such an application is where several people are in the same room and share the same VR experience with a projection (audio and video) of each participant also being present in the VR content.

In such an application, the VR environment may include an audio source corresponding to each participant but in addition to this, the user may, e.g. due to typical leakage of the headphones, also hear the other participants directly. This interference may be detrimental to the user experience and may reduce immersion for the participant. However, performing noise cancellation on the real sound component is very difficult and is computationally very expensive. For example, most typical noise cancelling techniques are based on a microphone within the headphone and using a feedback loop to minimize (preferably completely attenuate) any real world signal component in the microphone signal (thus the microphone signal may be considered the error signal driving the loop). However, such an approach is not feasible when it is desired for the audio source to be present in the perceived audio.

The apparatus of FIG. 2 may in many embodiments and scenarios provide an improved user experience in the presence of local audio which is also present in the VR scene.

The receiver 201 of the apparatus of FIG. 2 receives audio data for an audio scene as previously mentioned. In the example, the audio data specifically includes a first audio component or object representing a real-world audio source present in the audio environment of a user. The first audio component may accordingly provide audio signal data and position data for a local real-world audio source, such as for example a local speaker/participant who is also present locally (e.g. in the same room).

The apparatus may specifically be arranged to render the audio scene data to provide the user with an experience of the audio scene. However, rather than merely render the audio scene directly, the apparatus is arranged to (pre) process the audio data/components prior to rendering such that the result is compensated for the direct sound that may be received for audio sources that are present in both the audio scene represented by the audio data and in the real-world local environment. As previously described, in VR (including AR) scenarios, external real sounds can interfere with the rendered virtual sounds and the coherence of the virtual content, and the approach of the apparatus of FIG. 2 in preprocessing/compensating for the real-world sounds may mitigate this and provide a substantially improved audio experience.

The term virtual will in the following be used to refer to audio components and sources of the audio scene represented by the received audio data while the audio sources and components of the external environment will be referred to by the term real-world. Real-world sound is received and heard by the user as it will propagate from the corresponding real-world audio source to the (ear(s) of the) user by real world (physical) sound propagation, and thus be vibrations in the air and/or media (material).

The apparatus of FIG. 2 is not based on dynamically controlling or modifying the real-world sound by e.g. noise cancellation. Rather, the approach is based on seeking to modify the rendered virtual sound based on the real-world sound such that the rendered virtual sound is compensated for the effect that the real-world sound may have on the overall perception by the user. The approach employed is typically based on compensating the rendering of the virtual audio sources such that the combined effect of the virtual audio source rendering and the real-world sound results in the perceived effect at the user corresponding to the virtual audio source described by the received audio data.

The approach specifically determines a target property which reflects the desired perception of the user. The target property is determined from the received audio data and may typically be a property for the audio component as defined by the audio data, such as e.g. the desired level or position of the audio source. The target property may specifically correspond to a property of the signal component as defined by the received audio data. In conventional approaches, the audio component will be rendered with this property, for example it will be rendered as originating from the position or level defined by the audio data for the audio component. However, in the apparatus of FIG. 2, this value may instead be used as a target property for a combined audio component corresponding to the combination of the virtual audio component and the real-world audio component for the same source, i.e. the target property is not a target property for the rendering of the virtual audio component but is a target property for the combination at the user's ear of the virtual audio component and of the real-world audio component. Thus, it is a target property for the combination of the sound that is produced at the user's ear by the rendering of the appropriate received audio data and the real-world sound that reaches the user via real-world sound propagation. The combination thus reflects the combination of the virtual audio rendered to the user and the real world sound that the user hears directly.

Accordingly, having determined the target property, the apparatus further determines/estimates a property of the real-world audio component, such as a property or level of the real-world audio component. The apparatus may then proceed to determine a modified or adjusted property for the rendering of the virtual audio component based on the estimated property of the real-world audio component and the target audio component. The modified property may specifically be determined such that the combined audio component has a property closer to the target property, and ideally such that it will match the target property. The modified property of the virtual audio component is thus generated to compensate for the presence of the real-world audio component to result a combined effect which is closer to the one defined by the audio data. As a low complexity example, the level of the virtual audio component may be reduced to compensate for the level of the real-world audio component such that the combined audio level matches (or at least is closer to) the level defined by the audio data.

The approach may accordingly be based on not directly controlling the real-world sound but on compensating for the effect/contribution of these (e.g due to external sound leaks) at possibly the psychoacoustic level, so that the perceived interference from the real-world sound is reduced. This may provide a more consistent and coherent sound stage perception in many embodiments. For instance, if an audio object should be rendered at the angle Y° in the virtual environment and a real-world equivalent audio source is emitting from direction X°, then the position property for the virtual audio component be modified such that it is rendered at a position Z°, so that Z°>Y°>X°, thereby countering the mis-position effect caused by the real-world audio. In the case of intensity compensation, if a virtual audio component in accordance with the received audio data should be rendered with an intensity of |Y| in the virtual environment, and the real-world equivalent audio source is emitting a real-world audio component at an intensity of |X|, then the virtual audio component will be modified to be rendered at a reduced intensity |Z| with |Z|<|Y|, and ideally such that |Y|=|X|+|Z|.

A particular advantage of the approach of FIG. 2 is that it in many practical scenarios and embodiments allow for substantially improved performance with low complexity and reduced computational resource requirements. Indeed, in many embodiments, the preprocessing prior to rendering may simply correspond to modifying a parameter, such as changing a gain/level. In many embodiments, it may not be necessary to perform detailed signal processing but rather the process simply adjusts a general property, such as a level or position.

The apparatus specifically comprises an estimator 203 which is arranged to estimate a first property of a real-world audio component for the real-world audio source.

The estimator may estimate the first property as a property of a real-world audio component reaching the user (and specifically the user's ear) from the real-world audio source via sound propagation.

The real-world audio component reaching the user (and specifically the user's ear) from the real-world audio source via sound propagation may thus specifically reflect the audio from the real-world audio source received via an acoustic sound propagation channel, which e.g. may be represented by an acoustic transfer function.

Sound propagation (specifically real-world sound propagation) is propagation of sound by vibrations in air and/or other mediums. It may include multiple paths and reflections. Sound may be considered vibrations that travel through the air and/or another medium (or mediums) and which can be heard when they reach a person's or animal's ear. Sound propagation may be considered propagation of audio by vibrations that travel through the air and/or another medium.

The real-world audio component may be considered to represent the audio form the real-world audio source which would be heard by the user if no audio was rendered. The real-world audio component may be an audio component that only reaches the user by sound propagation. Specifically, the real-world audio component may be an audio component reaching the user from the real-world audio source by being communicated/propagated through a sound propagation channel including only physical vibrations and with no electrical or other signal domain transformation, capture, recording or any other change. It may represent a completely acoustic audio component.

The real-world audio component may be a real-time audio component, and it may specifically be received in real time such that the time difference between the real-world audio source and the user (or specifically the user's ear) is given by (is substantially equal to) the acoustic delay the delay resulting from the speed of the vibrations travelling through the air/mediums) from the real-world audio source to the user. The real-world audio component may be the audio component corresponding to what is heard of the real-world audio source if the first audio component is not rendered.

The first property may for example be a level, position, or frequency content/distribution of the real-world audio component. The property of the real-world audio component may specifically be a property of the audio component when reaching the user, and specifically the user's ear, or may e.g. be a property of the audio component at the audio source.

In many embodiments, the property may be determined from a microphone signal captured by a microphone positioned in the environment, such as for example a level of the audio component captured by a microphone positioned within the headphone. In other embodiments, the property may be determined in other ways, such as for example a position property corresponding to the position of the real-world audio source.

The receiver 201 and the estimator 203 are coupled to a target processor 205 which is arranged to determine a target property for the combined audio component for the audio source which is received by the user. The combined audio component is thus the combination of the real-world audio component and the rendered audio of the virtual audio component for the same audio source when received by the user. The target property may accordingly reflect the desired property of the combined signal that is perceived by the user.

The target property is determined from the received audio data and may specifically be determined as the property of the virtual audio component as defined by the audio data. For example, it may be a level or position of the virtual audio component as defined by the audio data. This property for the rendering of the virtual audio component defines/describes the virtual audio component in the audio scene and thus reflects the intended perceived property of the virtual audio component in the audio scene when this is rendered.

The target processor 205 is coupled to an adjuster 207 which is also coupled to the receiver 201. The adjuster 207 is arranged to determine a render property for the virtual audio component by modifying a property of the virtual audio component from the value indicated by the audio data to a modified value which is then used for the rendering. The modified value is determined based on the target property and the estimated property of the real-world audio component. For example, the position for the virtual audio component may be set based on the desired position as indicated by the audio data and on the position of the real-world audio source relative to the user pose (and e.g. also based on the estimated level of the real-world audio component).

The adjuster 207 is coupled to a renderer 209 which is fed the audio data and the modified property and which is arranged to render the audio of the audio data based on the modified property. Specifically, it renders the virtual audio component with the modified property rather than with the original property defined by the received audio data.

The renderer 209 will typically be arranged to provide a spatial rendering and may for example in some embodiments render the audio components of the audio scene using a spatial speaker setup such as a surround sound loudspeaker setup or e.g. using a hybrid audio sound system (combination of loudspeaker and headphone).

However, in many embodiments, the renderer 209 will be arranged to generate a spatial rendering over headphones. The renderer 209 may specifically be arranged to apply binaural filtering based on HRTFs or BRIRs to provide a spatial audio rendering over headphones as will be known to the skilled person.

The use of headphones may provide a particularly advantageous VR experience in many embodiments with a more immersive and personalized experience, in particular in situations where a plurality of participants are present in the same room/local environment. Headphones may also typically provide attenuation of the external sound thereby facilitating the provision of a sound stage consistent with the audio scene defined by the received audio data and with reduced interference from the local environment. However, typically such attenuation is not complete and there may be a significant leakage of sound through the headphones. Indeed, in some embodiments, it may even be desirable for the user to have some audio perception of the local environment. However, for local real-world audio sources that are also present in the virtual audio scene, this may as mentioned cause audio interference between the virtual and real-world source resulting in an audio experience that is less consistent e.g. with the visual rendering of the virtual scene. The apparatus of FIG. 2 may perform a preprocessing which can reduce the perceptual impact of the presence of the real-world audio sources.

The approach may be particularly interesting in the case of real sound surrounding a user wearing headphones while those sounds (or the object they represent) are also part of the VR/AR environment, i.e. when the energy of the surrounding sounds can be re-used to render the binaural content played through the headphone and/or when the surrounding sounds do not have to be totally suppressed. On the one hand, the headphone is reducing the intensity and the directivity of the sound (headphone leakage), on the other hand it is not possible to totally suppress and replace these surrounding sounds (it is almost impossible to perfectly phase align non-stationary sounds in real time). The apparatus may compensate for the real-world sound thereby improving the experience to the user. For example, the system may be used to compensate for acoustic headphone leakage or/or attenuation, frequency, and direction of incidence.

In many embodiments, the property may be a level of the audio components. Thus, the target property may be an absolute or relative level of the combined audio component, the estimated property for the real-world audio component may be an absolute or relative level, and the render property may be an absolute or relative level.

For example, the received audio data may represent the virtual audio component with a level relative to other audio components in the audio scene. Thus, the received audio data may describe the level of the virtual audio component relative to the audio scene as a whole and the adjuster 207 may directly set the target property to correspond to this level. Further, a microphone position within the headset may measure the audio level of the real-world audio component from the same audio source. In some embodiments, the level for the real-world audio component from the same audio source may for example be determined by correlating the microphone signal with the audio signal of the virtual audio component and the magnitude of the correlation may be set based on this (e.g. using a suitable monotonic function).

The adjuster 207 may then proceed to determine the render property as a render level that corresponds to the level defined by the received audio data but reduced by a level corresponding to the level of the real-world audio component. As a low complexity example, the adjuster 207 may be arranged to do this by adapting a gain for the virtual audio component (absolute or relative to other audio components in the audio scene), e.g. by setting the gain as a monotonically decreasing function of the correlation between the microphone signal and the virtual audio component signal. This last example is e.g. suitable in the case of a classical VR scenario where the approach may seek to fit the VR content as much as possible.

In the case of an AR scenario where some real world elements needs to be augmented, a monotonically increasing function could be considered. This function could also be set to zero before a certain threshold of correlation before increasing (depending on the artistic intent). The estimator 203 may use different approaches to determine the level of the real-world audio component in different embodiments. In many embodiments, the level may be determined based on a microphone signal for one or more microphone signals situated within the headphone. As mentioned previously, the correlation of this with the virtual audio component may be used as an estimated level property of the real-world audio component.

In addition, the estimator 203 may use the overall level attenuation property of the headphone to estimate more accurately the perceived level at the close ear region. Such estimate may directly be transmitted to the adjuster 207 as the level of a real world audio component.

In the case of a microphone situated on the headphone and recording outside the headphone, the estimator 203 may use the overall level attenuation property of the headphone to estimate more accurately the perceived level at the close ear region. Such estimate may directly be transmitted to the adjuster 207 as the level of a real world audio component. In some embodiments the target property may be a position property, and may specifically be the perceived position of the combined audio component. In many embodiments, the target property may be determined as the intended perceived position of the combined audio corresponding to the audio source. The audio data may include a position of the virtual audio component in the audio scene and the target position may be determined to be this indicated position.

The estimated property of the real-world audio component may correspondingly be a position property, such as specifically the position of the audio source of the real-world audio component. The position may be a relative or absolute position. For example, the position of the real-world audio component/source may be determined as an x,y,z coordinate (or 3D angular coordinates) in a predetermined coordinate system of the room or may e.g. be determined relative to the headset of the user.

The estimator 203 may in some embodiments be arranged to determine the position in response to dedicated measurement signals. For example, in embodiments where each audio source corresponds to a participant with multiple participants being present in the same room, the headsets of the participants may comprise e.g. infrared ranging functionality that can detect the distance to other headsets, as well as potentially to fix points in the room. The relative positions of the headsets and participants, and thus the relative position to other real-world audio sources (the other participants) can be determined from the individual distance ranges.

In some embodiments, the estimator 203 is arranged to determine the first property in response to a detection of an object corresponding to the audio source in an image of the audio environment. For example, one or more video cameras may monitor the environment, and face or head detection may be used to determine the positions of individual participants in the images. From this, the relative positions of the different participants, and thus the different real-world audio sources, may be determined.

In some embodiments, the estimator 203 may be arranged to determine a position of an audio source from capturing of sound from the audio source. For example, a headset may comprise external microphones on the side of the headset. The direction to a sound source may then be estimated from a detection of the relative delay between the two microphones for the signal from the audio source (i.e. the difference in arrival time indicates an angle of arrival). Two microphones can determine the angle of arrival in a plan (azimuth). A third microphone may be required to determine the elevation angle and the exact 3D position.

In some embodiments, the estimator 203 may be arranged to determine a position of an audio source from different capturing techniques such as sensors producing depth maps, heat maps, GPS coordinate or light field (cameras).

In some embodiments, the estimator 203 may be arranged to determine a position of an audio source by combining different modalities, i.e. different capturing methods. Typically, a combination of video and audio capturing techniques may be used to identify the position of an audio source both in the image and in the audio scene, hence enhancing the accuracy of the position estimation.

The adjuster 207 may be arranged to determine the render property as a modified position property. Modifications in terms of 3D angular coordinates are more practical as they are a user centric representation, but the transcription in x,y,z coordinates is an option. The adjuster 207 may for example change the position to the opposite direction with respect to the direction from the virtual source to the real-world source in order to compensate from the mismatch of position between real-world and virtual. This can be reflected on the distance parameter or one of the angular parameters or a combination depending on the situation. The adjuster 207 may for example change the position by modifying left and right ear level such that the combination of acoustic+rendered has an inter-channel level difference (ILD) corresponding to the desired angle relative to the user.

In some embodiments, the target property may be a frequency distribution of the combined audio component. Similarly, the render property may be a frequency distribution of the rendered virtual audio component and the estimated property of the real-world signal may be a frequency distribution of the real-world audio component at the ears of the user.

For example, the real-world audio component may reach the user's ears via an acoustic transfer function that may have a non-flat frequency response. The acoustic transfer function may for example in some embodiments predominantly be determined by the frequency response of the attenuation and leakage of the headphones. The acoustic attenuation of headphones to external sound may vary substantially for different headphones, and even in some cases for different users or different fits and positions of the headphones. In some cases, the headphone transfer characteristic/function may be substantially constant for the relevant frequencies and it may accordingly often be considered to be modelled by a constant attenuation or leakage measure.

However, in practice, the headphone transfer characteristics will typically have a significant frequency dependency within the audio frequency range. For example, typically low frequency sound components will be less attenuated than high frequency components and the resulting perceived sound will sound different.

In other embodiments, such as when audio rendering is by loudspeakers and the user does not wear headphones, the acoustic transfer function may reflect the overall acoustic response from the real-world source to the user's ear. This acoustic transfer function may be dependent on room characteristics, the position of the user, the position of the real-world audio source etc.

In cases where the frequency response of the acoustic transfer function from the real-world audio source to the user's ear is not flat, the resulting real-world audio component will have a different frequency response than the corresponding virtual audio component (e.g. rendered by headphones with a frequency response that can be considered frequency flat). Accordingly, the real-world audio component will not only cause a change in the level of the combined audio component but will also cause a change in the frequency distribution. Thus, the frequency spectrum of the combined audio component will differ from that of the virtual audio component as described by the audio data.

In some embodiments, the rendering of the virtual audio component may be modified to compensate for this frequency distortion. In particular, the estimator 203 may determine the frequency spectrum (frequency distribution) of the real-world audio component received by the user.

The estimator 203 may for example determine this by a measurement of the real-world audio component during a time interval in which the virtual audio component is intentionally not rendered. As another example, the frequency response of e.g. headphones worn by the user may be estimated based on generating test signals in the local environment (e.g. constant amplitude frequency sweeps) and measuring the results using a microphone within the headphone. In yet other embodiments, the leakage frequency response of the headset may be known e.g. from previous tests.

The frequency distribution of the real-world audio component at the user's ear may then be estimated by the estimator 203 to correspond to the frequency distribution of the real-world audio component filtered by the acoustic transfer function, and this may be used as the estimated property of the real-world audio component. In many embodiments, the indication of the frequency distribution may indeed be a relative indication and thus the frequency response of the acoustic transfer function may in many embodiments be used directly by the apparatus (as e.g. the estimated property of the real-world audio component).

The adjuster 207 may proceed to determine the render property as a modified frequency distribution of the virtual audio component. The target frequency distribution may be that of the virtual audio component as represented by the received audio data, i.e. the target frequency spectrum of the combined audio component perceived by the user is the frequency spectrum of the received virtual audio component. Accordingly, the adjuster 207 may modify the frequency spectrum of the rendered virtual audio component such that it complements the real-world audio component frequency spectrum and such that these add up to the desired frequency spectrum.

The adjuster 207 may specifically proceed to filter the virtual audio component by a filter determined to be complementary to the determined acoustic transfer function. Specifically, the filter may substantially be the reciprocal of the acoustic transfer function.

Such an approach may in many embodiments provide an improved frequency distribution and a perceived reduced distortion, and may specifically result in the combined audio being perceived by the user having a reduced frequency distortion than if the unmodified virtual audio component was rendered.

In some embodiments, the adjuster may be arranged to determine the render property in response to a psychoacoustic threshold for detecting audio differences. The human psychoacoustic ability (minimum audible angle (possibly frequency and azimuth dependent), minimum auditory movement angle, etc) could be used as internal parameter to decide how much the system should compensate for the incoming external sound leaks.

For example, in the case where the render property is a position property: the adjuster may specifically use the human ability to perceive separate sources as one. The ability can be used in order to define an angular maximum between the position of the real-world audio source and the position of the virtual (rendered) audio source.

As this human ability is also affected by the human vision, i.e. if the user can see (or not) one (or many) matching visual counterpart(s) at the given position(s), the corresponding, different angular maximums can be chosen based on information about whether matching objects can be seen by the user in virtual or real environment.

In some embodiments, the adjuster 207 may be arranged to determine the render property in response to information about whether a user is able to see the visual counterpart of the real-world audio source (AR case) or the visual counter part of the virtual audio source (VR case) or both (Mixed reality).

The above angular maximum can also be chosen based on the audio sources frequencies or azimuths as it has an impact on the human ability.

Another example is the use of the human ability to match a visual object to an audio element. This can be used for the render property as a maximum angular modification amplitude of the target property, on condition that the visual object or at the same position as the audio source in the receive data.

For scenarios outside those human psychoacoustic limits, the adjuster may be arranged in order to not disrupt the overall experience.

For example, the adjuster 207 may not perform any modification outside those limits.

In some embodiments, the renderer 209 may be arranged to provide a spatial rendering that will ensure a smooth transition between situations where the apparatus is able to compensate for the mismatch between real-world and virtual source within human psychoacoustic ability and situation where the apparatus cannot compensate within those limits and prefer to not affect the rendering.

For example, the renderer (209) may use a temporal smoothing filter on the given render property transmitted to the renderer (209).

The described apparatus accordingly seeks to adapt the rendering of a virtual audio component based on properties of a real-world audio component for the same real-world audio source. In many embodiments, the approach may be applied to a plurality of audio components/audio source and specifically to all audio components/audio sources that exist in both the virtual and real-world scenarios.

In some embodiments, it may be known which audio components of the audio data have real-world origins and for which there is a local audio source. For example, it may be known that the virtual audio scene is generated to only include local real-world audio sources (e.g. in a localized VR/AR experience).

However, in other cases, this may only be the case for a subset of the audio components. In some embodiments, the receiver may receive the audio components that have real-world sources in the user's environment from one or more different sources than the sources that are purely virtual for the current user, as they may be provided through a specific (part of the) interface.

In other cases, it may not be known a priori which audio components have real-world counterparts.

In some embodiments, the receiver 201 may be arranged to determine which audio components have real-world counterparts in response to metadata of the audio scene data. For example, the received data may e.g. have dedicated metadata indicating whether individual audio components have real-world counterparts or not. For example, for each audio component in the received audio data, there may be included a single flag indicating whether it reflects a local real-world audio source or not. If so, the apparatus may proceed to compensate the audio component prior to rendering as described above.

Such an approach may be highly advantageous in many applications. In particular, it may allow a remote server to control or guide the operation of the audio apparatus and thus of the local rendering. In many practical applications, the VR service is provided by a remote server and this server may not only have information of where real-world audio sources are located but may also determine and decide which audio sources are included in the audio scene. Accordingly, the system may allow efficient remote control of the operation.

In many embodiments, the receiver 201 of the apparatus of FIG. 2 may be arranged to determine whether a given audio component corresponds to a local real-world audio source or not.

As previously described this may specifically be done by correlating the audio signal for a virtual audio component with a microphone signal capturing the local environment. The term correlation may include any possible similarity measurement including audio classification (e.g. audio event recognition, speaker recognition), position comparison (in a multi-channel recording) or signal processing cross-correlation. If the maximum correlation exceeds a given threshold, it is considered that the audio component has a local real-world audio component counterpoint and that it corresponds to a local audio source. Accordingly, it may proceed to perform rendering as previously described.

If the correlation is below the threshold, it is considered that the audio component does not correspond to a local audio source (or that the level of this is so low that it does not cause any significant interference or distortion) and the audio component may therefore directly be rendered without any compensation.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. An audio apparatus, comprising:

a receiver circuit, wherein the receiver circuit is arranged to receive an audio data for an audio scene, wherein the audio data comprises a first audio component, wherein the first audio component represents a real-world audio source in a live audio environment of a user;

a determinator circuit, wherein the determinator circuit is arranged to determine a first property of a real-world audio component, wherein the real-world audio component reaches the user from the real-world audio source;

a target processor circuit, wherein the target processor circuit determines a target property for a combined audio component, wherein the combined audio component is received by the user in response to the audio data, wherein the combined audio component is a combination of the real-world audio component received by the user and rendered audio of the first audio component;

an adjuster circuit, wherein the adjuster circuit determines a render property for the first audio component by modifying a property of the first audio component from a value, wherein the value is indicated by the audio data, wherein the render property of the first audio component is determined in response to the target property and the first property; and a renderer circuit, wherein the renderer circuit is arranged to render the first audio component in response to the render property.

2. The audio apparatus of claim 1, wherein the target property is a target perceived position of the combined audio component.

3. The audio apparatus of claim 1, wherein the target property is a level of the combined audio component.

4. The audio apparatus of claim 3, wherein the adjuster circuit is arranged to determine the render property as a render level, wherein the render level corresponds to a level for the first audio component reduced by an amount determined as a function of a level of the real-world audio component received by a user.

5. The audio apparatus of claim 1, wherein the target property is a frequency distribution of the combined audio component.

6. The audio apparatus of claim 5, wherein the renderer circuit is arranged to apply a filter to the first audio component, wherein the filter has a frequency response, wherein the frequency response is complementary to a frequency response of an acoustic path from the real-world audio source to the user.

7. The audio apparatus of claim 1, wherein the determinator circuit is arranged to determine the first property in response to an acoustic transfer characteristic for external sound for a headphone, wherein the headphone is used to render the first audio component.

8. The audio apparatus of claim 7, wherein the acoustic transfer characteristic comprises at least one of a frequency response and a headphone leakage property.

9. The audio apparatus of claim 1, wherein the determinator circuit is arranged to determine the first property in response to a microphone signal, wherein the microphone signal captures the live audio environment of the user.

10. The audio apparatus of claim 1, wherein the adjuster circuit is arranged to determine the render property in response to a psychoacoustic threshold, wherein the psychoacoustic threshold is arranged to detect audio differences.

11. The audio apparatus of claim 1, wherein the determinator circuit is arranged to determine the first property in response to a detection of an object, wherein the object corresponds to the audio source in an image of the live audio environment.

12. The audio apparatus of claim 1, wherein the receiver circuit is arranged to identify the first audio component as corresponding to the real-world audio source in response to a correlation between the first audio component and a microphone signal, wherein the microphone signal captures the live audio environment of the user.

13. The audio apparatus of claim 1, wherein the receiver circuit is arranged to identify the first audio component as corresponding to the real-world audio source in response to metadata of the audio scene data.

14. The audio apparatus of claim 1, wherein the audio data represents an augmented reality audio scene, wherein the augmented reality audio scene corresponds to the live audio environment.

15. The audio apparatus of claim 1, wherein the real-world audio component reaches the user via sound propagation.

16. A method of processing audio data, the method comprising:

receiving audio data for an audio scene, wherein the audio data comprises audio data for a first audio component, wherein the first audio component represents a real-world audio source in a live audio environment of a user;

determining a first property of a real-world audio component, wherein the real-world audio component reaches the user from the real-world audio source;

determining a target property for a combined audio component, wherein the combined audio component is received by the user in response to the audio data for the first audio component, wherein the combined audio component is a combination of the real-world audio component received by the user and rendered audio of the first audio component received by the user;

determining a render property for the first audio component by modifying a property of the first audio component, wherein the property of the first audio component is indicated by the audio data for the first audio component in response to the target property and the first property; and rendering the first audio component in response to the render property.

17. The method of claim 16, wherein the real-world audio component reaches user via sound propagation.

18. The method of claim 16, wherein the target property is a target perceived position of the combined audio component.

19. The method of claim 16, wherein the target property is a level of the combined audio component.

20. A computer program stored on a non-transitory medium, wherein the computer program when executed on a processor performs the method as claimed in claim 16.

* * * * *